(12) United States Patent
Snop

(10) Patent No.: US 7,038,180 B2
(45) Date of Patent: May 2, 2006

(54) ISOSTAT FOR TREATING MATERIALS AND METHOD OF REMOVING CERAMIC MATERIAL FROM METAL ARTICLES USING THE SAME

(75) Inventor: Vladimir Isakovich Snop, Moscow (RU)

(73) Assignee: Autoclave, High Pressure & Temperature Limited, Tortola (VG)

( * ) Notice: Subject to any disclaimer, the term of this patent is extended or adjusted under 35 U.S.C. 154(b) by 9 days.

(21) Appl. No.: 10/994,515

(22) Filed: Nov. 23, 2004

(65) Prior Publication Data

US 2005/0189347 A1    Sep. 1, 2005

(30) Foreign Application Priority Data

Nov. 26, 2003    (RU) ............................... 2003134260

(51) Int. Cl.
*H05B 6/26*    (2006.01)

(52) U.S. Cl. .................................................. 219/651
(58) Field of Classification Search ................ 219/651, 219/647, 600

See application file for complete search history.

(56) References Cited

U.S. PATENT DOCUMENTS

| 5,641,423 | A * | 6/1997 | Bridges et al. | 219/770 |
| 6,344,638 | B1 * | 2/2002 | Tomasello | 219/770 |
| 6,768,087 | B1 * | 7/2004 | Kikuchi | 219/680 |
| 6,777,692 | B1 * | 8/2004 | Jongen | 250/492.1 |
| 6,800,835 | B1 * | 10/2004 | Sims et al. | 219/780 |

* cited by examiner

*Primary Examiner*—Daniel Robinson

(57) ABSTRACT

The disclosed isostat for treating materials comprises a hermetic container connected to a gas supply means, an induction heater and an open-top working chamber that are arranged therein, the chamber being mounted above the heater and designed for placing the article to be treated and the working medium therein. The working chamber is made in the form of a vessel with double walls and a bottom therebetween, the inner wall of the vessel defines a reaction chamber, the bottom of which is located above the heater higher than the bottom between the walls of the vessel, the bottom between the walls is located lower than the exposure zone of the heater, and the isostat is provided with a heat-insulating chamber, the wall of which is located in the space between the walls of the vessel with a gap between the open lower butt of the heat-insulating chamber and the bottom between the walls of the vessel, and with a gap between the closed butt thereof and the upper open butt of the reaction chamber.

2 Claims, 3 Drawing Sheets

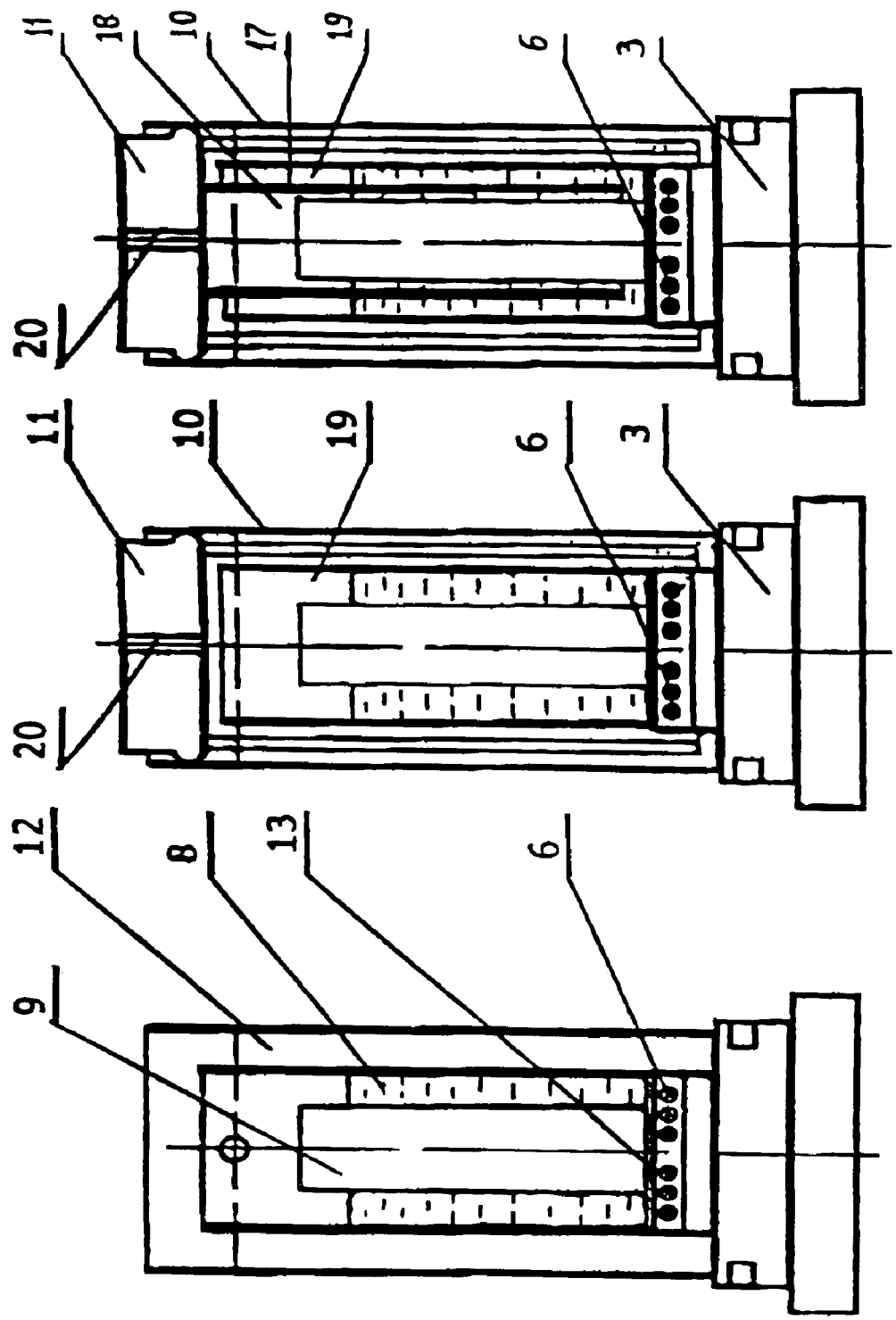

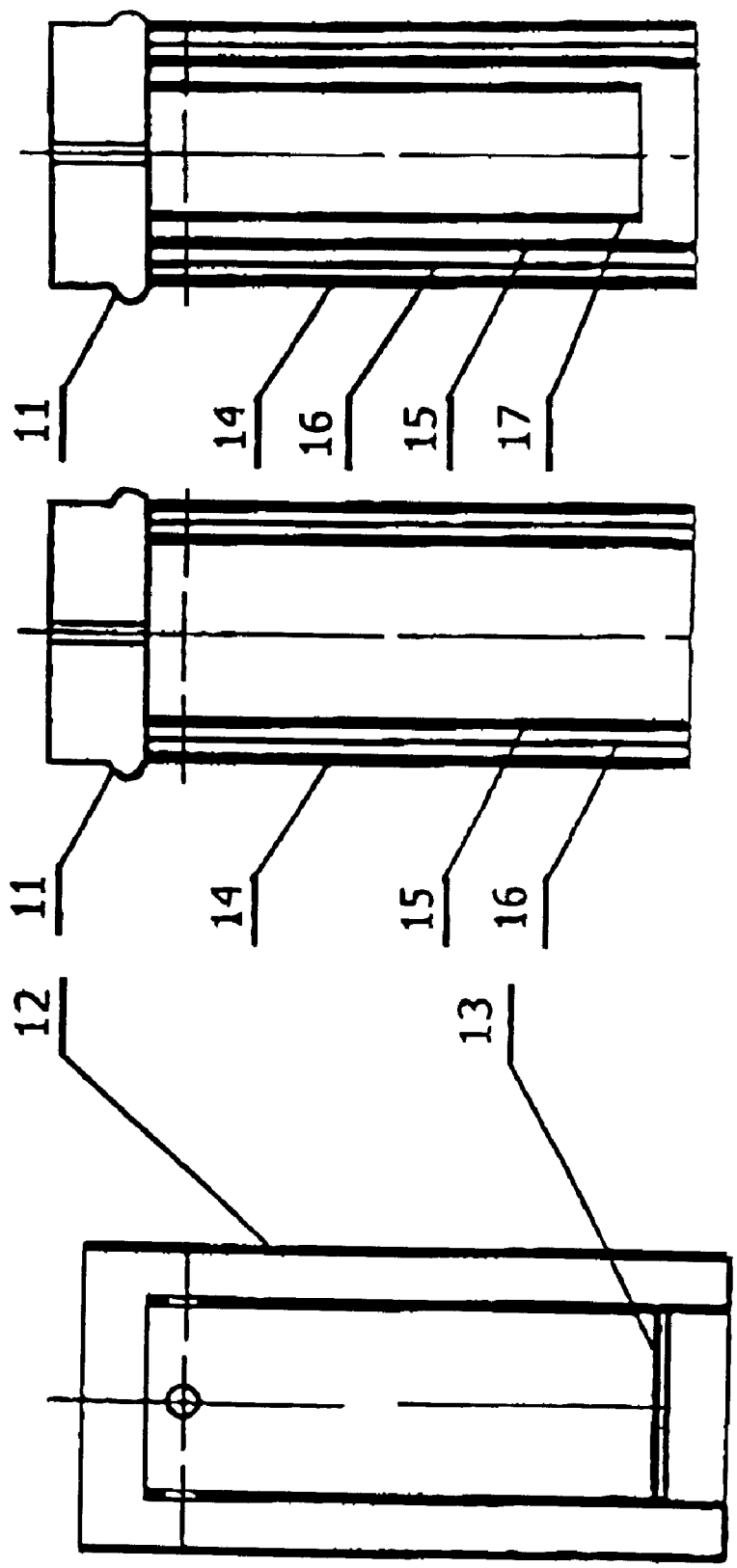

ISOSTAT FOR TREATING MATERIALS AND METHOD OF REMOVING CERAMIC MATERIAL FROM METAL ARTICLES USING THE SAME

FIELD OF THE INVENTION

The invention relates to powder metallurgy and, in particular, to equipment and methods of treating materials in a chemically active liquid, vapor or gaseous medium at high pressures and temperatures and can be most efficiently used in dissolving ceramic materials and their structural transformations under pressure of 10 to 200 MPa and at temperatures of 300° C., or more.

STATE OF THE ART

Devices are known in prior art to be used for high-temperatures treatment of workpieces, with gas emissions being purified, for instance, a device according to patent RU 2002583C1, C1. B22F3/14, comprising a gas supply and removal system and a container hermetically closed with an upper and a lower plug, in which are located a heat-insulation hood and a heater, and also a guiding system for gas flows in the form of closed-loop vertical bulkheads embracing each other and closed at one of the butts thereof. Such design has a substantial disadvantage, when articles are treated in a liquid—low efficiency of heating the central zone with the article, since the multihood system for purifying gas emissions with gaps between the hoods is, to a substantial degree, a heat-insulating member between the heater and the article, that increases power consumption and the time needed to heat up the article to a predetermined temperature with a large gradient of temperatures between the heater and the article, so that the heater gets overheated and, as a result, has short service life.

This disadvantage is eliminated in the design of an isostat for treating materials in a liquid, which is the closest prior art with respect to the present disclosure (patent RU 2151026C1, C1. B22F 3/14, 3/15; publ. Jun. 20, 2000), where a vessel with the liquid is mounted directly above an electroinductive heater with a highly efficient take-off of heat by the liquid at the bottom of the vessel. The known isostat for treating materials comprises a hermetic container connected to a gas supply means, a heater and an open-top working vessel that are arranged therein, the vessel being mounted on the heater and designed for placing the article to be treated and the working medium therein.

However, when heating up to the temperatures exceeding the boiling temperature of the liquid, in the known isostat, heat losses are sharply increased due to evaporation, followed by condensation on the walls of the container, thus making the heating low efficient.

The disclosed invention, in what concerns the device, solves the problem of extending technological capabilities when treating articles in the liquid under pressure and at high temperatures. The technical result of the invention consists in that the proposed design of a reactor characterized by the presence of heat-insulating and reaction chambers forming a liquid seal in the cooled zone hinders outlet of vapor from the reaction zone and its condensation on the cooled walls of the container, whereby reducing power consumption, eliminating the contact of the chemically active liquid with the walls of the container and extending substantially the temperature range of reliable operation of the isostat.

A method is known in prior art to be used for removing ceramic rods out of metal castings in autoclaves at high temperature and under high pressure—U.S. Pat. No. 4,141,781, publication date: Feb. 27, 1979. The leaching temperature in a solution of KOH or NaOH is 290 to 350° C. This temperature range has been extended to 450° C. in patent SU 1738470A1, publ. Jun. 7, 1992 where treatment in an alkali melt without a liquid aqueous component is disclosed. The process of treatment in an alkali melt is one of the most efficient methods of treatment. However, a hardly soluble layer of products of the reaction between alkali and ceramic material is formed on the surface of the ceramic rod in this process—a factor that substantially decelerates the reaction and requires an intermediate cycle of treatment in an aqueous solution in order to remove said layer while reloading the articles. An increase in the number of cycles substantially reduced the economic efficiency and power intensity of the process.

This disadvantage can be remedied to a substantial degree by the method described in U.S. Pat. No. 3,563,711, publ. Feb. 16, 1971 the method being close to that of the presently claimed invention. In this case, the alkali solution is heated to a temperature of 200 to 350° C., preferably 290° C., and then pressure is released down to the level at which the liquid component of the alkali solution boils in the pores of the ceramic rods, whereupon pressure is again raised up to the level higher than the boiling point of the liquid component of the alkali solution, and the process is repeated. If the treatment according to this method is carried out within below-critical ranges of temperatures and pressures, the reaction rate is slower than in case of using the above-critical range. When attempts to realize the method under the above-critical conditions are made, the process of raising and reducing the autoclave vapor pressure becomes a technically complicated and economically unjustified operation in view of high power intensity of raising vapor pressure. Besides, the method is deficient because of the problems of controlling the process by pressure.

DISCLOSURE OF THE INVENTION

The object of the invention disclosed herein in what concerns the method is to eliminated these disadvantages owing to a cyclic variation in the temperature of the alkali solution within the range of from 10 to 20 degrees below the critical point of the liquid component of the alkali solution and up to 5 to 10 degrees above the melting temperature of the hundred-percent alkali melt under pressure of 1 to 2 MPa above the critical value for the liquid constituent of the solution. Additional intensification of the leaching process is ensured due to a variation in the solution level within the zone where the articles get positioned under the influence of the cyclic variation in pressure of gas, for instance, nitrogen within the range exceeding the critical pressure of the liquid constituent of the alkali solution by 0.5 to 3 MPa, by means of the gas drive of the autoclave.

Thus, the method disclosed herein allows carrying out the leaching process both in an alkali melt, i.e. at hundred-percent concentration of alkali, and in the aqueous alkali solution of approximately fifty-percent concentration ensuring dissolution of the film formed of reaction products on the surface of the ceramic rods. The use of the claimed technical solutions reduces the cycle time from 12 hours, or more, in the known method to 6 hours, or less, in the claimed method.

The technical result is attained owing to that, in the isostat for treating materials, comprising a hermetic container connected to a gas supply means, an induction heater and an open-top working chamber that are arranged therein, the chamber being mounted above the heater and designed for placing the article to be treated and the working medium therein, the working chamber is made in the form of a vessel with double walls and a bottom therebetween, the inner wall of the vessel defines a reaction chamber, the bottom of which is located above the heater higher than the bottom between the walls of the vessel, the bottom between the walls is located lower than the exposure zone of the heater, and the isostat is provided with a heat-insulating chamber, the wall of which is located in the space between the walls of the vessel with a gap between the open lower butt of the heat-insulating chamber and the bottom between the walls of the vessel, and with a gap between the closed butt thereof and the upper open butt of the reaction chamber.

Besides, it can be also provided with a hood located in the reaction chamber with a gap between its open butt and the bottom of the reaction chamber and connected within its upper portion to the gas supply means.

The technical result is attained also owing to that, in the method of removing ceramic elements from metal articles, consisting in treating the articles in a reactor with a heated alkali solution under pressure of vapor and gaseous medium above the solution, characterized in that an isostat made in the manner described herein above is used as the reactor, heating of the aqueous alkali solution in the reaction chamber is carried out by means of the induction heater up to a temperature higher than the critical point for the liquid constituent of the solution until it changes to a fluid condition, the level of the liquid medium gets reduced in the reaction chamber and its vapors partially condense on the bottom between the walls of the vessel, thus forming a liquid seal, then the medium is heated further in the reaction chamber up to the final temperature exceeding the melting point of alkali at partial vapor pressure of the liquid constituent of the solution that is equal to or higher than its critical pressure, followed by holding it at said parameters in the reaction chamber, and then the medium is cooled in the reaction chamber down to a temperature below the critical point for the liquid constituent of the solution until its vapors partially condense in the reaction chamber and the level of the liquid medium gets increased in the reactor, whereupon heating up and cooling down to said parameters are repeated periodically until the ceramic material is removed completely from the metal article.

Preferably, the final temperature of heating exceeds the melting point of alkali by 5 to 10 degrees at partial vapor pressure of the liquid constituent of the solution equal to or higher, but by no more than 2 MPa, than its critical pressure.

In a particular case of using the isostat, after the medium is heated up in the reaction chamber to the final temperature, pressure is varied cyclically under the hood, when holding the medium thereafter in the reaction chamber, by the gas supply means, thereby varying periodically the level of alkali solution under the hood, whereupon cooling is carried out.

Along with this, the cyclic variation in pressure under the hood is preferably carried out within the pressure range exceeding the critical pressure of the liquid constituent of the alkali solution by 0.5 to 3 MPa.

LIST OF DRAWINGS

The claimed isostat is shown in FIGS. 1 to 7:

FIG. 2 is a longitudinal sectional view illustrating the working chamber mounted on the lower plug above the induction heater, where an article being treated is shown in its cavity filled with a chemically active medium;

FIG. 3 is a longitudinal sectional view illustrating the working chamber shown together with the heat-insulating chamber without the central hood, prior to loading thereof into the container;

FIG. 4 is a longitudinal sectional view illustrating the working chamber shown together with the heat-insulating chamber with the central hood, prior to loading thereof into the container;

FIG. 5 is a longitudinal sectional view illustrating the working chamber;

FIG. 6 is a longitudinal sectional view illustrating the heat-insulating chamber without the central hood;

FIG. 7 is a longitudinal sectional view illustrating the heat-insulating chamber with the central hood.

PREFERRED EMBODIMENTS OF THE INVENTION

Figure 1:
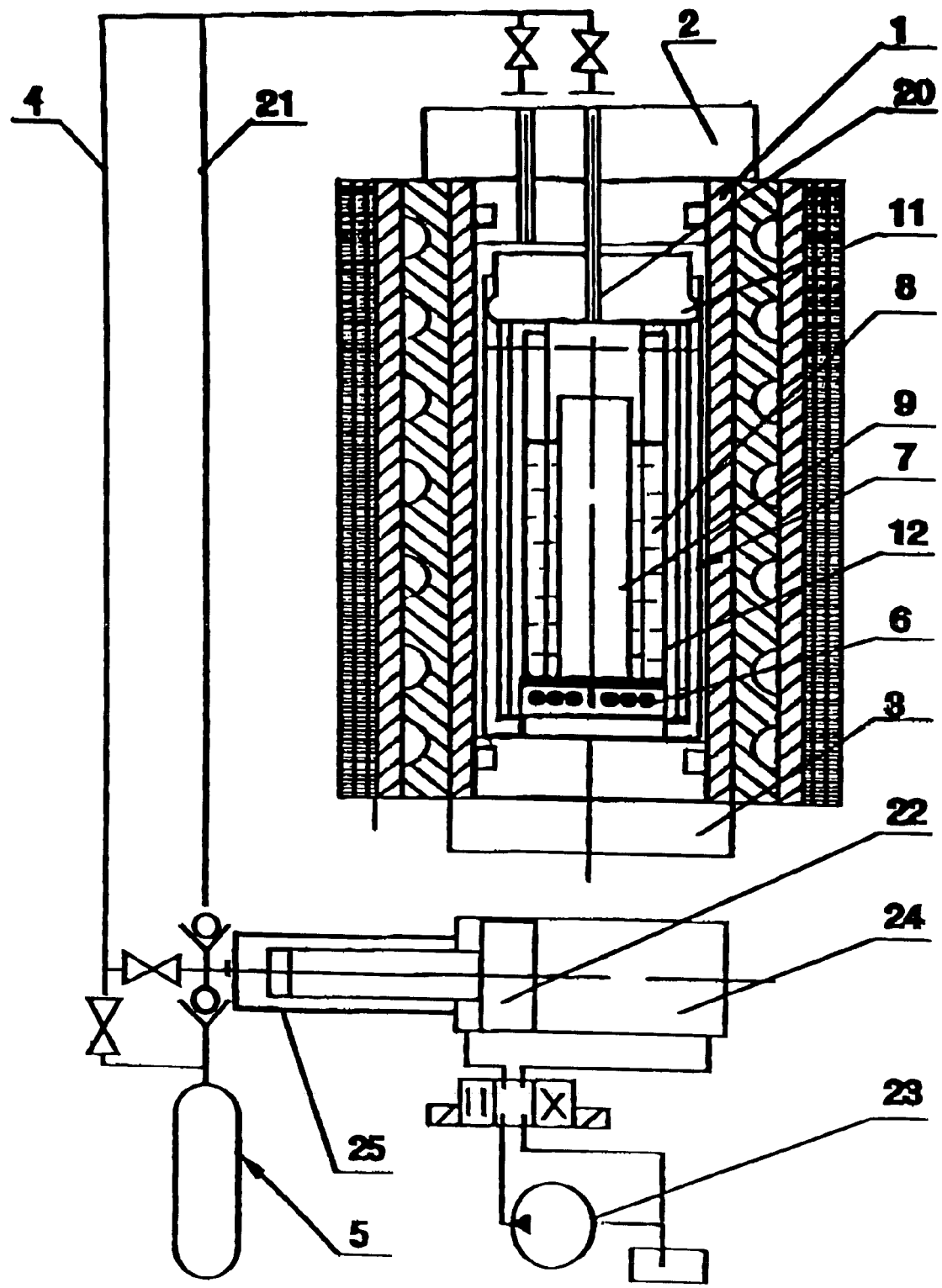
FIG. 1 is a schematic diagram illustrating the isostat in a longitudinal sectional view, shown it its working condition with gas and hydraulic drives.

The isostat for treating materials in a liquid, vapor or gaseous medium comprises a multi-body cooled power container 1 hermetically sealed at the butts thereof by an upper and a lower plug 2 and 3, respectively. The upper plug 2 is connected via a gas channel 4 to a gas supply means 5. On the lower plug 3, there is an induction heater 6, above which a reactor 7 is located. The reactor 7 is made in the form of cylindrical thin-walled members and contains a working zone filled with a chemically active working medium 8 with an article 9 to be treated therein, the working zone being defined between a working chamber 10 and a heat-insulating chamber 11. The working chamber 10 (FIG. 2, FIG. 5) is made in the form of a vessel open at the top and having double walls of a thin-walled corrosion-resistant material. The inner wall of the vessel defines a reaction chamber 12 with a hermetical bottom welded into the central portion of the vessel. The outer surface of the bottom 13 is located above the induction heater 6, and the article 9 to be treated is located on the inner surface thereof. The bottom of the working chamber 10 between the walls is located lower than the heater 6 and arranged next to the butt of the cooled lower plug 3. There are gaps between the open lower butt of the heat-insulating chamber 11 and the bottom of the vessel between the walls as well as between the closed upper butt of the chamber 11 and the open upper butt of the chamber 12. The heat-insulating chamber 11 can be made in the form of two hoods 14 and 15 (FIGS. 6 and 7) of a thin-walled corrosion-resistant material that are separated from one another by a heat-insulating material and inserted concentrically into one another, the hoods being provided with hermetic covers. The heat-insulating layer of the chamber 11 can be made within a side portion thereof in the form of a gas cavity between the hoods 14 and 15, the cavity being divided by a thin-walled shell 16 of a thin-walled corrosion-resistant material welded in between the hoods, and provided with a hermetic cover. The reaction chamber 12 where the article 9 to be treated is placed can be divided by a thin-walled hood 17 of a thin-walled corrosion-resistant material, the hood being hermetical at the top and open at the bottom, into a central and a side portion 18 and 19, respectively, with a gap being provided between the lower butt of the hood 17 and the bottom 13. The central portion 18 is connected by a hermetic gas channel 20 in the hoods 14, 15 and 17 via a channel in the upper plug 2 and a gas line 21 to the gas supply means 5. The gas supply means 5 comprises a booster 22 having a hydraulic cavity 23 connected to a hydraulic drive 24, and a gas cavity 25 connected by the gas line 21 to the working zone of the reactor.

Description of the Isostat Operation

The isostat for treating materials operates and the method of removing ceramic elements from metal articles is carried out as follows.

The chemically active medium 8, for instance, an aqueous KOH alkali solution, and the article 9 to be treated are loaded into the reaction chamber 11 that is on the lower plug 3 outside of the container 1 (FIG. 2). The working chamber 10 (FIG. 2, FIG. 5) is covered by the heat-insulating chamber 11 (FIG. 3, FIG. 4). The article 9 and the medium 8 are then positioned within the working zone defined by the working and heat-insulating chambers 10 and 11, respectively. The lower plug 3 together with the assembly mounted thereon is inserted into the container 1. The container 1 is sealed and then filled up with a gaseous medium, for instance, nitrogen, via the gas channel 20, the gas line 21 and the gas drive 5, so that an initial pressure is reach therein which is equal to about 0.3 to 0.5 of the design final pressure in the container. As the pressure grows in the container 1, in case if the hood 17 is in its place, the chemically active medium will overflow from the side portion 19 of the working zone into the central portion 18 thereof beneath the hood 17 until pressures are equalized in any cross-section of the container 1. The induction heater 6 is switched on, which warms up the bottom 13 of the reaction chamber 12, the chemically active medium 8 and the article 9 to be treated. The bottom the chamber 12 remains cool between the walls. As the medium is heated up, the liquid component of the medium, for instance, water, evaporates from the KOH solution. Evaporation continues until the partial vapor pressure of the liquid constituent above the chemically active medium 8 reaches the liquid saturation pressure. For instance, for water at 100° C., the saturation pressure is 0.101 MPa; at 200° C.—1.550 MPa; at 300° C.—8.592 MPa; and at 374.12° C.—22.115 MPa (the critical point for water). With a variation in temperature within the reaction zone so that in becomes higher or lower than the critical point, the solution level varies from maximum at a below-critical temperature where the liquid constituent is available in the form of a liquid, to minimum at an above-critical temperature where the liquid constituent is available in the form of vapor (or supercritical fluid). When heating, pressure under the hood 17 is growing faster than outside of it, and the chemically active medium 8 first together with vapor squeezes nitrogen and then the vapor itself out of the central portion 18 into the side portion 19. After the temperature of the chemically active medium 8 and the partial vapor pressure of the liquid constituent become equal to critical values (for water, 374.12° C. and 22.1150 MPa, respectively), the liquid constituent will get evaporated and then transfer to its fluid condition (i.e., the condition in which the densities of vapor and liquid coincide, and for water they are equal to 317.763 kg/m$^3$). When evaporating, the vapor of liquid constituent, thus formed, partially displaces the gaseous medium out of the working zone. The quantity of the liquid constituent by mass is selected based on the following condition: the ratio between the mass of the liquid constituent and the free volume of the working zone is 1 to 2% higher than the critical density of the liquid constituent. To be assumed as the free volume is the volume of the working zone of the reactor less the volume occupied by both the article being treated and the solid constituent of the chemically active medium. When the hood 17 is used, the total volume of the solution must not exceed the volume of the side portion 19 of the working zone of the reactor, with allowance made for expansion of the solution when heated up to the maximum temperature of the process. After the temperature in the working zone exceeds the critical value, pressure in it will grow, and vapor can partially ingress from the reaction chamber 12 to the cavity between its walls. Due to its condensation within the cold lower portion of the cavity between these walls, a liquid seal is formed which prevents vapor from leaving the reaction zone any more. Equilibrium is thus reached; and no further evaporation takes place. The level of the liquid seal is defined by the geometry of the container and of the working chamber, by pressure in the container as well as by the parameters of loading and also those of the chemically active medium. Variations in temperature and pressure within the entire volume of the container 1 and the reactor 7 are automatically equalized by the liquid seal taking a respective position, thus ensuring that equal pressures are maintained in all the cavities without the use of any additional means for controlling the pressure differential.

After this, the working zone together with the article 9, the solid constituent of the chemically active medium (solid alkali), the vapor of the liquid constituent of the medium, and the gaseous medium is heated up to the final temperature that exceeds the melting point of the alkali by 5 to 10 degrees under the partial vapor pressure of the liquid constituent equal to the critical pressure of the latter or exceeding it by 1 to 2 MPa. For KOH alkali, this is 410 to 415° C. After this, holding is carried out at the predetermined parameters of the process. During the holding, the position of the liquid medium level is changed periodically (1 to 5 times per minute) as follows.

The heater 6 is switched off, and the medium is cooled in the working chamber 10 down to a temperature that is 10 to 20 degrees below the critical temperature for the liquid constituent of the solution, also the pressure of the vapor-gaseous medium decreases, the aqueous constituent condenses within the entire volume of the central portion, including the pores of the ceramic rods in the castings, and the level of the solution rises in the working chamber 10. Then, the heater 6 is switched on, and the heating of the solution together with the castings is repeated again, thereby the solution level and the alkali concentration in the reaction chamber 12 are periodically varied due to appropriate variations in temperature, by 50 to 80 degrees, and pressure, by 0.5 to 3 MPa, in the container, and the cycles described herein above are repeated continuously as long as required, usually for 1 to 6 hours; the temperature is at last reduced, pressure released and the articles taken out.

When the isostat is used with the hood 17 in each cycle or only in some of the cycles, the castings heated up to the predetermined final temperature are, in addition, treated under variable pressure of gaseous medium, changed cyclically by the booster 22 with an amplitude of 0.5 to 3 MPa; and, in doing so, with an increase in pressure under the hood 17, the solution level within the central portion 18 falls down, and in the side portion 19, grows. As pressure is falling down within the central portion 18 of the reaction chamber 12, the level of alkali melt therein grows, and in the side portion, falls, thereby the melt levels in the central and side portions of the working zone of the reactor get periodically varied due to a corresponding variation in pressure within the container.

As soon as the last cycle is over, the heater 6 is de-energized, and the reactor is cooled down to a temperature of 100 to 170° C. Pressure decreases down to the atmospheric pressure through the channel 20, and the lower plug 3 with the reactor, the alkali solution and the article 9 is removed out of the container. The heat-insulating chamber 11 is taken off and the article 9 is removed out of the working chamber 10. A new article is then loaded and the process described herein above is repeated.

What is claimed is:

1. An isostat for treating materials, comprising a hermetic container connected to a gas supply means, an induction heater and an open-top working chamber that are arranged therein, the chamber being mounted above the heater and designed for placing the article to be treated and the working medium therein, characterized in that the working chamber is made in the form of a vessel with double walls and a bottom therebetween, the inner wall of the vessel defines a reaction chamber, the bottom of which is located above the heater higher than the bottom between the walls of the vessel, the bottom between the walls is located lower than the exposure zone of the heater, and the isostat is provided with a heat-insulating chamber, the wall of which is located in the space between the walls of the vessel with a gap between the open lower butt of the heat-insulating chamber and the bottom between the walls of the vessel, and with a gap between the closed butt thereof and the upper open butt of the reaction chamber.

2. The isostat according to claim 1, characterized in that it is provided with a hood located in the reaction chamber with a gap between its open butt and the bottom of the reaction chamber and connected within its upper portion to the gas supply means.

* * * * *